United States Patent

[11] 3,588,253

[72] Inventor Horst R. Wittmann
 Huntsville, Ala.
[21] Appl. No 821,584
[22] Filed May 5, 1969
[45] Patented June 28, 1971
[73] Assignee The United States of America as represented by the Secretary of the Army

[54] TEMPERATURE TUNABLE LASER DIODE SPECTROGRAPH
 2 Claims, 1 Drawing Fig.
[52] U.S. Cl. ............................................. 356/93, 331/94.5, 356/95
[51] Int. Cl. ............................................. G01j 3/42, H01s 3/00
[50] Field of Search ............................................. 331/94.5; 356/88, 93, 95

[56] References Cited
UNITED STATES PATENTS
2,984,149 5/1961 Herscher et al. ............... 356/88

OTHER REFERENCES
"Chemical Instrumentation"; Strobel, H. A.; Addison-Wesley Pub. Co. Inc.; Reading, Mass; Copyright 1960; pg. 208— 213

"Gallium-Arsenide Electroluminescent and Laser Diodes" Henry T. Minden, SEMICONDUCTOR PRODUCTS; Vol. 6 #8 Aug. 1963: pg. 36 – 38
"Scanatron-A Scanning Beam Semiconductor Laser" SOLID STATE DESIGN; Benjamin Lax; Vol. 6 March 1965 pg. 22
"Progress in Semiconductor Lasers", Benjamin Lax "IEEE Spectrum" July 1965; pg. 67

Primary Examiner—Ronald L. Wibert
Assistant Examiner—V. P. McGraw
Attorneys—Harry M. Saragovitz, Edward J. Kelly, Herbert Berl and Aubrey J. Dunn ABSTRACT: A spectrograph wherein the light from a laser diode is used to examine optical absorption and reflection characteristics of a sample material. A laser diode is maintained in a temperature controlled environment. The variation of the temperature of the diode is used to vary the wavelength of the single mode emission from the diode. The monochromatic light emitted by the diode is used to examine the reflection or absorption edge of sample materials. Photodiodes are used to convert light pulses into electrical pulses. The degree to which the single mode, narrow band laser light is attenuated by the sample and the wavelength at which absorption or reflection edges occur is determined by a differential method.

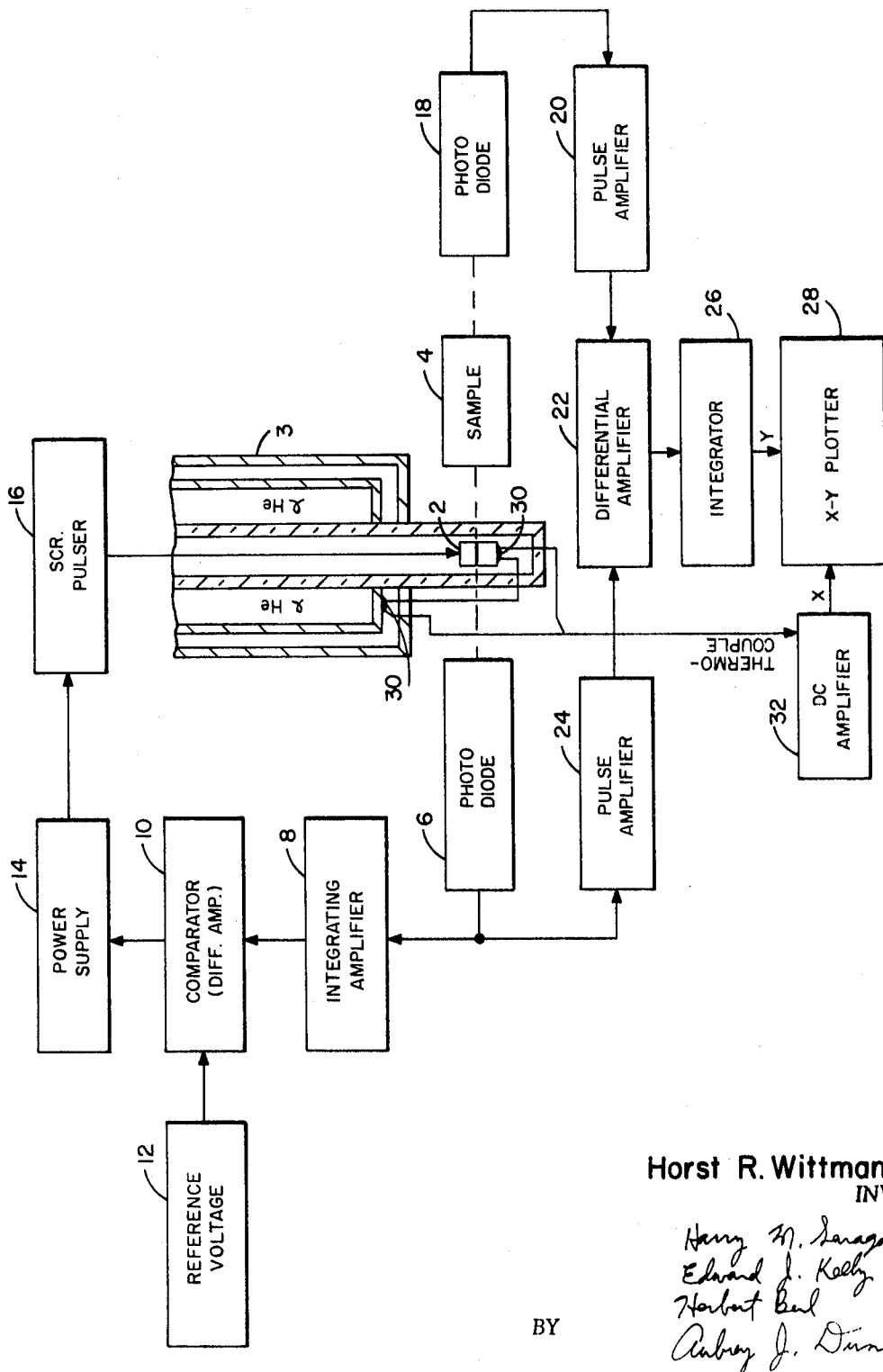

3,588,253

TEMPERATURE TUNABLE LASER DIODE SPECTROGRAPH

SUMMARY OF THE INVENTION

This invention provides a high resolution spectrograph which has a limited scanning range. The spectrograph employs a tunable monochromatic light source, in particular, a GaAs laser diode which is temperature tunable between wavelengths of 840 nm. and 885 nm. Semiconductor lasers for other spectral ranges are available. Proper variation of the temperature of the diode assures single mode emission from the diode. The monochromatic light emitted by the diode is used to examine the reflection or absorption edge of sample materials. Photodiodes are used to convert light pulses into electrical pulses. By a differential method, the degree to which the single mode, narrow band laser light is attenuated by the sample and the wavelength at which the absorption or reflection edges occur may be determined.

Optical absorption and reflection characteristics depend on chemical and physical properties of the material. Obviously, the amount and the spectrum of light passing through or reflected from the material is indicative of the characteristics of the material. Accordingly, a signal indicative of the attenuated light and the wavelength of the light may be used to determine the inherent characteristics of the material being examined.

This invention provides a simple direct approach for illuminating a sample material with laser light, varying the wavelength of the laser light, determining the attenuation of light by the sample material and determining the wavelength of the light to arrive at the optical characteristics of the sample material.

BRIEF DESCRIPTION OF THE DRAWING

The single FIGURE drawing is a block diagram schematic of the present invention.

DESCRIPTION OF THE PREFERRED EMBODIMENT

Referring to the drawing, laser diode 2 is positioned in Dewar flask 3 which has a temperature tunable, optical tail. Liquid helium is used to control the temperature of the environment in which the laser diode is positioned. The wavelength of single mode emission from the diode is dependent upon the temperature of the diode. By varying the temperature of the diode it is possible to vary the wavelength of the laser light from the diode. It is possible to vary the temperature from approximately 10° K. to 300° K. and obtain a wavelength of single mode emission from approximately 840 nm. to 885 nm. In general, the temperature dependence of wavelength above 100° K. is similar to all GaAs laser diodes but below 100° K. fabrication methods cause an appreciable deviation between the similarities of GaAs laser diodes. It has been found that epitaxially grown diodes with a long interdiffusion time of the PN junction cover a wider spectral range than diodes with a short interdiffusion time. It has been found that the emission intensity of a GaAs laser in single mode operation is independent of temperature. Hence, the injection current at different temperatures must be adjusted for constant emission intensity which assures single mode operation. Injection currents at low repetition rates are required to prevent excessive heating of the junction. The discharge of a capacitor gated by a SCR generates short current pulses which are injected into the lasing junction. The integrated signal from an intensity monitoring diode is compared with a reference voltage set to be equal to the integrated intensity of single mode emission. A deviation of the integrated signal from the reference voltage during temperature variation of the laser causes a change of the injection current until single mode operation is obtained. Thus, constant intensity and spectral purity of the laser light source is assured.

The ratio of the emission intensities from the two cleaved emitting faces of laser diode 2 is constant in single mode operation. One face is used to illuminate sample 4 while the other face is used to illuminate a fast Si photodiode 6. Photodiode 6 serves as instantaneous intensity reference for the absorbance measurements of sample 4 and as monitor for constant average emission intensity in the control loop for the injection current. The control loop consists of integrating amplifier 8, reference voltage 12, and comparator 10. Comparator 10 compares the output from integrating amplifier 8 with the output from reference voltage 12 and supplies an input to power supply 14. The power supply responds to the output from the comparator to control SCR pulser 16 and thereby control the injection current supplied to the lasing junction of diode 2.

The intensity of the beam attenuated by sample 4 is sensed by a fast Si photodiode 18 and compared with the signal from monitoring photodiode 6 in fast differential amplifier 22. Pulse amplifiers 20 and 24 are provided to amplify the outputs from photodiodes 18 and 6. Photodiodes 18 and 6 are connected to differential amplifier 22. Differential amplifier 22 provides as an output a signal which is indicative of the attenuation of the laser by sample 4 or the difference between the laser illuminating photodiodes 6 and 18. This difference is integrated by integrator 26 to represent the transmissivity of sample 4. The integrated difference representing the transmissivity of the sample is fed into the Y-axis of X-Y plotter 28. Due to the predetermined relation between the spectral position of the laser emission and the temperature, the voltage of AuCo/Cu thermocouples 30 attached to the laser holder gives the emitted wavelength as an electrical signal. This electrical signal is amplified by DC amplifier 32 and connected to drive the X-axis of X-Y plotter 28. Thus, the transmission spectrum is displayed by the curve plotted by plotter 28 as the temperature of diode 2 is varied.

I claim:

1. A spectroscope comprising: a laser light means comprising a laser diode having first and second light emitting cleaved faces; means for pulsing said laser light to maintain single mode emission of the laser light; means for varying the wavelength of said laser light comprising means for varying the temperature of said laser source; a sample of material illuminated by said laser light; and means for determining the amount of attenuation of said laser light by said sample comprising a first and a second photodiode and a differential amplifier, said first photodiode positioned to respond to the laser light emitted from said first face of said diode, said second photodiode positioned to respond to the laser light passing through said sample from said second face of said diode; said differential amplifier having first and second inputs respectively connected to the outputs of said first and second photodiodes; said differential amplifier providing an output indicative of the amount of attenuation of the light by the sample; wherein said means for pulsing said laser light means to maintain single mode emission of the laser light comprises a comparator having a first and a second input and an output; an integrating amplifier having an input connected to the output of said first photodiode and an output connected to said first input of said comparator; a reference voltage connected to said second input of said comparator; a power supply having an output and having an input connected to said output of said comparator; a SCR pulser having an input connected to said output of said power supply and an output connected to said laser diode whereby the injection current of said laser diode is adjusted to maintain emission intensity constant to thereby assure single mode operation of said laser diode.

2. A spectroscope as set forth in claim 1 to further comprise an integrator, an X-Y plotter, and means for determining the temperature of said laser diode and providing an output voltage indicative of said temperature; said output voltage being connected to a first input of said X-Y plotter; said output of said differential amplifier being connected to the input of said integrator; the output of said integrator being connected to a second input of said X-Y plotter, whereby the transmission spectrum is displayed by the plotted curve of said X-Y plotter.